(12) United States Patent
Vanderveen et al.

(10) Patent No.: US 11,076,262 B2
(45) Date of Patent: Jul. 27, 2021

(54) METHOD AND SYSTEM FOR VEHICLE LOCATION TRACKING USING V2X COMMUNICATION

(71) Applicant: BlackBerry Limited, Waterloo (CA)

(72) Inventors: Michaela Vanderveen, Tracy, CA (US); Nicholas James Russell, Newbury (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/403,138

(22) Filed: May 3, 2019

(65) Prior Publication Data

US 2020/0351616 A1 Nov. 5, 2020

(51) Int. Cl.
| | |
|---|---|
| *H04W 4/029* | (2018.01) |
| *H04W 4/40* | (2018.01) |
| *H04W 4/06* | (2009.01) |
| *H04W 12/03* | (2021.01) |
| *H04W 12/80* | (2021.01) |

(52) U.S. Cl.
CPC ............. *H04W 4/029* (2018.02); *H04W 4/06* (2013.01); *H04W 4/40* (2018.02); *H04W 12/03* (2021.01); *H04W 12/80* (2021.01)

(58) Field of Classification Search
CPC ......... H04W 4/029; H04W 4/40; H04W 4/06; H04W 12/007; H04W 12/001; H04W 4/44; H04W 4/46; H04W 4/12; H04W 4/80; H04W 12/03; H04W 12/80; G08G 1/20; H04L 63/0823
USPC ...................................................... 455/456.1
See application file for complete search history.

(56) References Cited

U.S. PATENT DOCUMENTS

| | | | |
|---|---|---|---|
| 10,089,869 B1* | 10/2018 | Makled | H04L 67/12 |
| 10,187,766 B2 | 1/2019 | Lee et al. | |
| 10,270,899 B1* | 4/2019 | Merjanian | G08B 25/12 |
| 2016/0358031 A1* | 12/2016 | Miller | G08G 1/0175 |
| 2016/0363935 A1* | 12/2016 | Shuster | B60L 7/10 |
| 2019/0051142 A1* | 2/2019 | Wiles | G08B 25/08 |
| 2019/0075447 A1 | 3/2019 | Lee et al. | |

OTHER PUBLICATIONS

3GPP TS 23.285 V16.0.0; 3rd Generation Partnership Project; Technical Specification Group Services and System Aspects; Architecture Enhancements for V2X Services; Release 16; Mar. 2019; 37 pages.
3GPP TS 33.106 V15.1.0; 3rd Generation Partnership Project; Technical Specification Group Services and System Aspects; 3G Security; Lawful Interception Requirements; Release 15; Jun. 2018; 22 pages.

(Continued)

*Primary Examiner* — Farid Seyedvosoghi
(74) *Attorney, Agent, or Firm* — Conley Rose, P.C.; J. Robert Brown, Jr.

(57) ABSTRACT

A method at a network element within a Vehicle to Everything (V2X) Communications Domain, the method including receiving a tracking request at the network element for a target vehicle, the tracking request including identifying information for the target vehicle; creating a target vehicle list based on the tracking request; distributing the target vehicle list to at least one V2X endpoint; receiving at least one sighting report from the at least one V2X endpoint; and forwarding the at least one sighting report to a second network element.

15 Claims, 11 Drawing Sheets

(56) References Cited

OTHER PUBLICATIONS

3GPP TS 33.107 V15.5.0; 3rd Generation Partnership Project; Technical Specification Group Services and System Aspects; 3G Security; Lawful Interception Architecture and Functions; Release 15; Mar. 2019; 386 pages.

3GPP TS 33.108 V15.4.0; 3rd Generation Partnership Project; Technical Specification Group Services and System Aspects; 3G Security; Handover Interface for Lawful Interception (LI); Release 15; Mar. 2019; 367 pages.

3GPP TS 33.126 V15.1.0; 3rd Generation Partnership Project; Technical Specification Group Services and System Aspects; Security; Lawful Interception Requirements; Release 15; Dec. 2018; 18 pages.

3GPP TS 33.127 V15.1.0; 3rd Generation Partnership Project; Technical Specification Group Services and System Aspects; Security; Lawful Interception (LI) Architecture and Functions; Release 15; Mar. 2019; 55 pages.

3GPP TS 33.128 V15.0.0; 3rd Generation Partnership Project; Technical Specification Group Services and System Aspects; Security; Protocol and Procedures for Lawful Interception (LI); Stage 3; Release 15; Mar. 2019; 63 pages.

IEEE Standards Association; "IEEE Standard for Wireless Access in Vehicular Environments - Security Services for Applications and Management Messages"; IEEE Std 1609.2-2016; Mar. 1, 2016; 241 pages.

IEEE Standards Association; "IEEE Standard for Wireless Access in Vehicular Environments (WAVE)—Networking Services"; IEEE Std 1609.3-2016; Jan. 2016; 160 pages.

IEEE Computer Society; "Part 11: Wireless LAN Medium Access Control (MAC) and Physical Layer (PHY) Specifications—Amendment 6: Wireless Access in Vehicular Environments"; IEEE Std 802.11p—2010; Jul. 15, 2010; 51 pages.

Camp LLC Vehicle Safety Communications 5 (VSC5); "Security Credential Management System Proof-of-Concept Implementation: EE Requirements and Specifications Supporting SCMS Software Release 1.2.2"; Nov. 15, 2016; 599 pages.

European Commission; Result of C-ITS Platform Phase II—Certificate Policy for Deployment and Operation of European Cooperative Intelligent Transport Systems (C-ITS); Release 1.1; Jun. 2018; 81 pages.

European Commission; Result of C-ITS Platform Phase II—Security Policy and Governance Framework for Deployment and Operation of European Cooperative Intelligent Transport Systems (C-ITS); Release 1; Dec. 2017; 36 pages.

ETSI EN 302 637-2 V1.3.1; "Intelligent Transport Systems (ITS); Vehicular Communications; Basic Set of Applications; Part 2: Specification of Cooperative Awareness Basic Service"; Sep. 2014; 44 pages.

ETSI EN 302 637-3 V1.2.1; "Intelligent Transport Systems (ITS); Vehicular Communications; Basic Set of Applications; Part 3: Specifications of Decentralized Environmental Notification Basic Service"; Sep. 2014; 73 pages.

ETSI EN 302 665 V1.1.1; "Intelligent Transport Systems (ITS; Communications Architecture"; Sep. 2010; 44 pages.

ETSI TS 101 331 V1.3.1; "Lawful Interception (LI); Requirements of Law Enforcement Agencies"; Oct. 2009; 30 pages.

ETSI TS 102 940 V1.3.1; "Intelligent Transport Systems (ITS); Security; ITS Communications Security Architecture and Security Management"; Apr. 2018; 42 pages ETSI TS 102 941 V1.2.1; "Intelligent Transport Systems (ITS); Security; Trust and Privacy Management"; May 2018; 71 pages.

Santesson, S., et al.; "X.509 Internet Public Key Infrastructure Online Certificate Status Protocol—OCSP"; RFC 6960; Jun. 2013; 41 pages.

International Telecommunication Union; "Technical Aspects of Lawful Interception: ITU-T Technology Watch Report #6"; May 2008; 12 pages.

International Telecommunication Union; "Series X: Data Networks, Open System Communications and Security—Information Technology—Open Systems Interconnection—The Directory: Public-Key and Attribute Certificate Frameworks"; ITU-T X.509; Oct. 2016; 254 pages.

Qualcomm, Incorporated.; "eCall Whitepaper"; Version 1.5; Mar. 2009; 14 pages.

PCT International Search Report & Written Opinion of the International Searching Authority; PCT/US2020/030720; dated May 27, 2020; 13 pages.

\* cited by examiner

METHOD AND SYSTEM FOR VEHICLE LOCATION TRACKING USING V2X COMMUNICATION

FIELD OF THE DISCLOSURE

The present disclosure relates to Vehicle to Everything (V2X) communications, and in particular relates to vehicle tracking utilizing V2X communications.

BACKGROUND

Lawful interception allows law enforcement entities to track a target and keep the data it sends and/or receives for a given period of time. The interception is traditionally done based on cellular telephone communications, where the information received for the target can include either the contents of the cellular communications and/or information about the cellular communication such as the parties involved, the duration, the location of the target, among other such information.

Cellular-based tracking of location rather than data is limited (e.g. cell-level granularity). However, in some cases, law enforcement may know about a vehicle associated with the target. For example, if a vehicle is stolen or involved in an incident such as a child abduction, a hit and run incident, fleeing from a police car, among other such incidents, then information about the vehicle may be known. In these cases, it is the location of the target, rather than the data it sends/receives that is of interest. The data the target receives/sends can also be intercepted, possibly separately, via means known in the art.

With the advent of Intelligent Transportation Systems (ITS), and Vehicle to Everything (V2X) communication, the leveraging of such system for lawful tracking of location would assist law enforcement.

BRIEF DESCRIPTION OF THE DRAWINGS

The present disclosure will be better understood with reference to the drawings, in which.

DETAILED DESCRIPTION OF THE DRAWINGS

Figure 1:
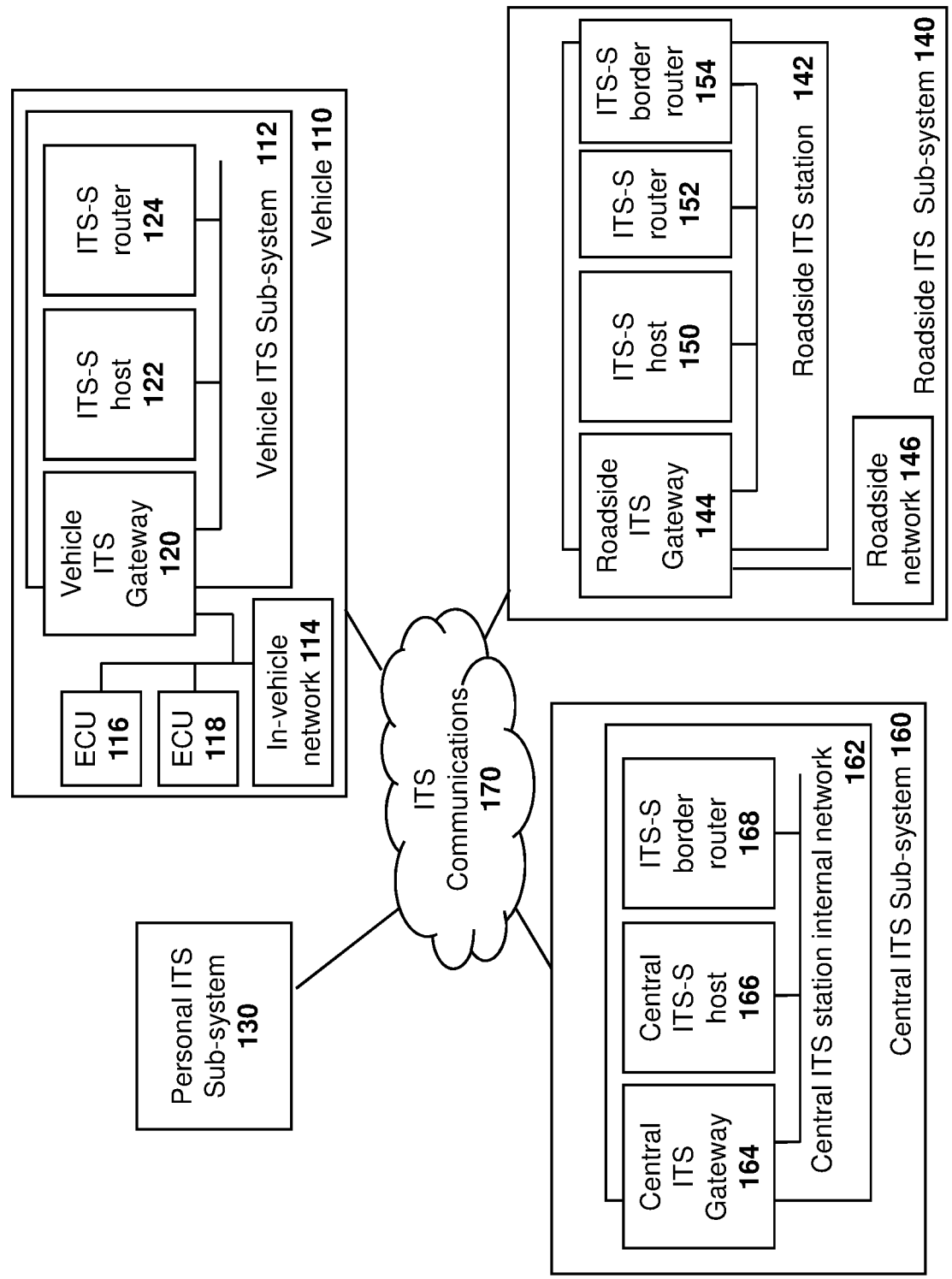
FIG. 1 is block diagram of an intelligent transportation system.

The present disclosure provides a method at a network element within a Vehicle to Everything (V2X) Communications Domain, the method comprising: receiving a tracking request at the network element for a target vehicle, the tracking request including identifying information for the target vehicle; creating a target vehicle list based on the tracking request; distributing the target vehicle list to at least one V2X endpoint; receiving at least one sighting report from the at least one V2X endpoint; and forwarding the at least one sighting report to a second network element.

The present disclosure further provides a network element within a Vehicle to Everything (V2X) Communications Domain, the network element comprising: a processor; and a communications subsystem, wherein the network element is configured to: receive a tracking request at the network element for a target vehicle, the tracking request including identifying information for the target vehicle; create a target vehicle list based on the tracking request; distribute the target vehicle list to at least one V2X endpoint; receive at least one sighting report from the at least one V2X endpoint; and forward the at least one sighting report to a second network element.

The present disclosure further provides a computer readable medium for storing instruction code, which, when executed by a processor of a network element within a Vehicle to Everything (V2X) Communications Domain cause the network element to: receive a tracking request at the network element for a target vehicle, the tracking request including identifying information for the target vehicle; create a target vehicle list based on the tracking request; distribute the target vehicle list to at least one V2X endpoint; receive at least one sighting report from the at least one V2X endpoint; and forward the at least one sighting report to a second network element.

In the embodiments described below, the following terminology may have the following meaning, as provided in Table 1.

TABLE 1

| Term | Brief Description |
|---|---|
| Terminology | |
| Data Connection | A connection that provides transport of data (e.g. IP datagrams) between two entities (e.g. ITS endpoint, CRL Provisioning Proxy, CRL Provisioning Server, etc.). May utilize a radio access network (e.g. cellular, IEEE 802.11p, wireless power access, satellite, etc.) or a wired access network (e.g. Ethernet, Digital Subscriber Line (DSL), cable, power-line data, etc.). |
| User Equipment (UE) | A device consisting of a Universal Integrated Circuit Card (UICC) and a Mobile Entity (ME). The UICC may contain one or more applications e.g. a Subscriber Identity Module (SIM), a Universal SIM (USIM), an IP Multimedia Subsystem (IMS) SIM (ISIM), etc. |
| V2X endpoint | An entity that can send and/or receive V2X related messaging e.g. vehicle, road-side unit (RSU), UE, etc. One implementation maybe an application |

TABLE 1-continued

Terminology

| Term | Brief Description |
|---|---|
| | residing on a communications module that communicates with an ME using AT commands. |

Intelligent Transportation System (ITS) software and communication systems are designed to, for example, enhance road safety and road traffic efficiency. Such systems include vehicle to/from vehicle (V2V) communications, vehicle to/from infrastructure (V2I) communications, vehicle to/from network (V2N) communications, vehicle to/from the pedestrian or portable (V2P) communications, vehicle to network alone (V2N), vehicle to devices such as electronic devices within a vehicle (V2D), electricity grid (V2G), and vehicle to network to vehicle (V2N2V). The communications from a vehicle to/from any of the above may be generally referred to as V2X.

Further, other elements in a system may communicate with each other. Thus, systems may include portable to/from infrastructure (P2I) communications, infrastructure to infrastructure (I2I) communications, portable to portable (P2P) communications (also known as peer to peer communications), among others. As used herein, V2X thus includes any communication between an ITS station and another ITS station, where the station may be associated with a vehicle, road side unit, network element, pedestrian, cyclist, animal, among other options. For example, vehicles on a highway may communicate with each other, allowing a first vehicle to send a message to one or more other vehicles to indicate that it is braking, thereby allowing vehicles to follow each other more closely.

Communications between elements of an ITS may further allow for potential collision detection and allow a vehicle with such a device to take action to avoid a collision, such as braking or swerving. For example, an active safety system on a vehicle may take input from sensors such as cameras, RADAR, LIDAR, and V2X, and may act on them by steering or braking, overriding or augmenting the actions of the human driver or facilitating autonomous driving where a human is not involved at all. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection/junction or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic/engine control units (ECUs) 116 or 118 in the environment of FIG. 1.

Vehicle ITS sub-system 112 may include a vehicle ITS gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3. ITS-S router 124 may be capable of converting protocols, for example for the ITS-S host 122.

Further, the ITS system of FIG. 1 may include a personal ITS sub-system 130, which may provide application and communication functionalities of ITS communications (ITSC) in handheld or portable devices, such as personal digital assistants (PDAs), mobile phones, user equipment, among other such devices.

A further component of the ITS system shown in the example of FIG. 1 includes a roadside ITS sub-system 140, which may contain roadside ITS stations which may be deployed on bridges, traffic lights, among other options.

The roadside ITS sub-system 140 includes a roadside ITS station 142 which includes a roadside ITS gateway 144. Such gateway may connect the roadside ITS station 142 with one or more roadside networks 146.

A roadside ITS station 142 may further include an ITS-S host 150 which may contain ITS-S applications and the functionalities needed for such applications.

The roadside ITS station 142 may further include an ITS-S router 152, which provides the interconnection of different ITS protocol stacks, for example at layer 3.

The roadside ITS station 142 may further include an ITS-S border router 154, which may provide for one or both of the interconnection of two protocol stacks and the interconnection to an external network.

A further component of the ITS system in the example of FIG. 1 includes a central ITS sub-system 160 which includes a central ITS station internal network 162.

Central ITS station internal network 162 includes a central ITS gateway 164, a central ITS-S host 166 and an ITS-S border router 168. Central ITS gateway 164, central ITS-S host 166 and ITS-S border router 168 have similar functionality to the Roadside ITS gateway 144, ITS-S host 150 and ITS-S border router 154 of the roadside ITS station 142.

Communications between the various components may occur through an ITS peer-to-peer communications network or via network infrastructure 170.

From FIG. 1 above, V2X communications may be used for both road safety and for improving efficiency of road transportation, including movement of vehicles, reduced fuel consumption, among other factors. In accordance with the embodiments of the present disclosure, V2X communications may further be expanded to include functionality for lawful interception to track vehicles.

V2X messages are defined by the European Telecommunications Standards Institute (ETSI) and fall into two categories, namely Cooperative Awareness Message (CAM) and Decentralized Environmental Notification Message (DENM). A CAM message is a periodic, time triggered message that may provide status information to neighboring ITS stations. The broadcast is typically over a single hop and the status information may include a station type, position, speed, heading, brake status, among other options. Optional fields in a CAM message may include information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include details about the causing event, detection time, event position, event speed, heading (if applicable), among other factors. DENM messages may be sent, for example, up to 20 times per second over a duration of several seconds.

Similar concepts apply to the Dedicated Short Range Communications (DSRC)/Wireless Access in Vehicular Environments (WAVE) system in which a Basic Safety Message (BSM) is specified instead of the CAM/DENM messaging from ETSI.

Cellular V2X

Various systems or architectures can provide V2X communication. Cellular networks, such as those defined in the Third Generation Partnership Project (3GPP) set of specifications are one of them. As defined above, another alternative is DSRC/WAVE which makes use of the Institute of Electrical and Electronics Engineers (IEEE) 802.11 radio technology. Thus, while the present disclosure is described with regards to cellular V2X communication, V2X messages may equally be sent through networks which are not 3GPP cellular networks. In particular, V2X communication may in one case proceed via the infrastructure using 802.11 technology.

Using the cellular example, various options are possible. These include unicast uplink and/or downlink via the infrastructure. A further option includes broadcast downlink transmission via the infrastructure. A further option includes device to device direct "sidelink" communication.

The various transmission modes may be combined. For example, a sidelink (a.k.a. PC5) or Uu (UE to base station) unicast uplink transmission might be used to get a V2X message from a vehicle to a cellular infrastructure and then to a network element such as a V2X application server. Any of a Multimedia Broadcast Multicast Service (MBMS) broadcast, ProSe broadcast, or Uu unicast might then be used to get a V2X message from the V2X application server via the cellular infrastructure to ITS stations.

Figure 2:
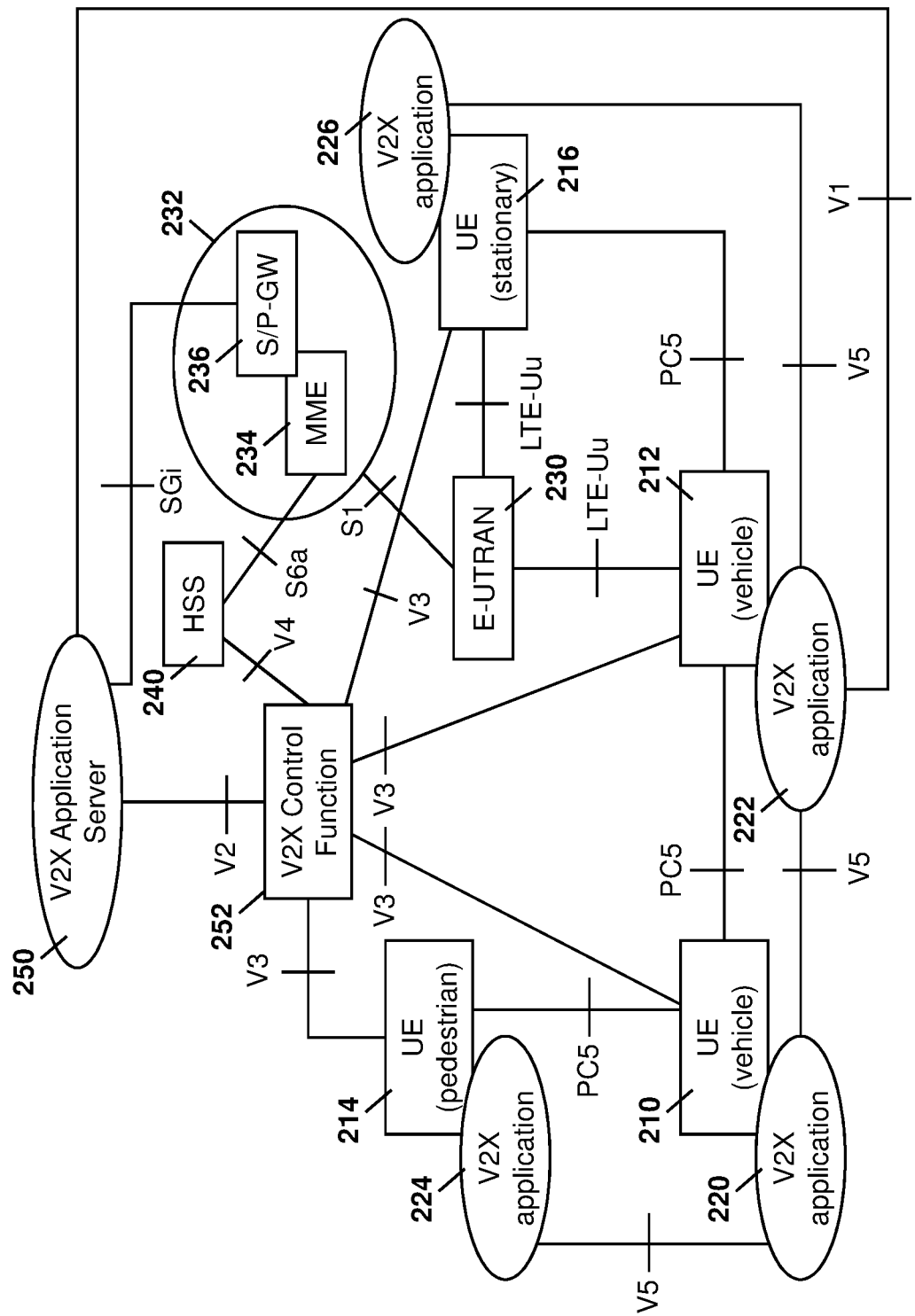
FIG. 2 is a block diagram showing an architecture for cellular based Vehicle to anything (V2X) communication.

For example, reference is now made to FIG. 2, which shows an example 3GPP system architecture that may be used for uplink and downlink communications for both the case of a Uu unicast, as well as for a PC5 transmission, as for example defined in the Third Generation Partnership Project (3GPP) Technical Specification (TS) 23.285, "*Architecture enhancements for V2X services*", for example v. 16.0.0, March 2019.

In the embodiment of FIG. 2, each of a plurality of ITS stations is defined as a user equipment (UE). These UEs are shown, for example, as UE 210 which may represent a vehicle ITS station, UE 212 which may represent another vehicle ITS station, UE 214 which may represent a pedestrian ITS station and UE 216 which may represent a stationary road side unit ITS station.

Each ITS station has an associated V2X application. Therefore, UE 210 has a V2X application 220, UE 212 has a V2X application 222, UE 214 has a V2X application 224, and UE 216 has a V2X application 226.

Each of the UEs may communicate with each other, for example, through a PC5 broadcast interface.

Further, the V2X applications may communicate between each other using a V5 reference point.

The cellular system may include, for example, an evolved-Universal Terrestrial Radio Access (E-UTRAN) 230, which may provide one or more base stations connected to an evolved packet core (EPC) 232.

The evolved packet core 232 may include a Mobility Management Entity (MME) 234 and a Service/Packet Gateway (S/P-GW) 236.

Communications between the UEs and the E-UTRAN may occur over an LTE-Uu unicast cellular communication channel. Further, the E-UTRAN 230 may communicate with the EPC 232 via an S1 interface.

The EPC 232, and in particular MME 234, communicates with a Home Subscriber Server (HSS) 240 via an S6a interface. Further, the S/P-GW 236 may communicate with a V2X application server 250 utilizing a SGi interface.

The V2X application server 250 is a network entity on the application layer that is accessible via the 3GPP network which provides for various services including receiving uplink data from a UE over unicast or PC5, delivering data to UEs in a target area using unicast delivery and/or PC5 and/or an MBMS delivery, mapping from geographic location information to appropriate target areas over which MBMS transmissions will be made, and providing the MBMS system with the information needed in order to ensure that the MBMS message can be formatted and transmitted over the appropriate area.

The V2X applications 220, 222, 224 and 226 communicate with the V2X application server. The V2X control function is used to provision the UE with necessary parameters in order to use V2X communication.

In the embodiment of FIG. 2, the V2X application server 250 may determine that the V2X messages are the type that need to be shared with other vehicles, which can be achieved using a Uu unicast downlink, PC5 broadcast or MBMS broadcast or multicast.

Figure 3:
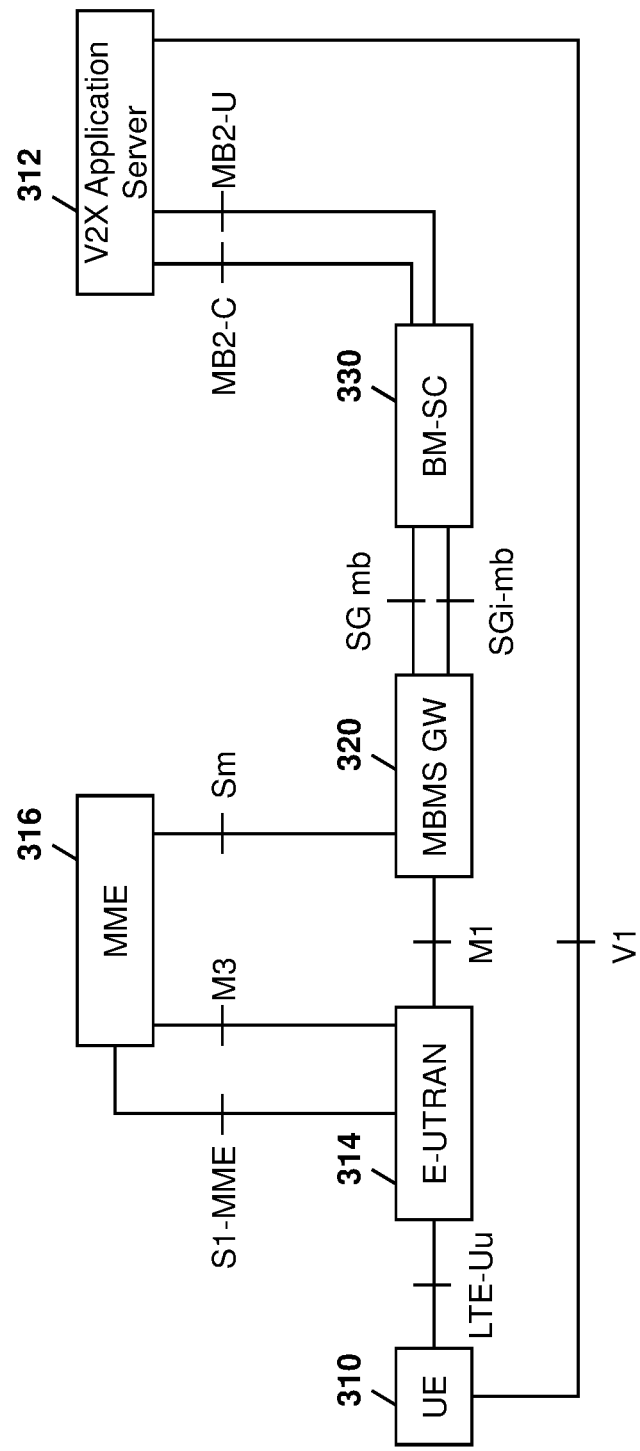
FIG. 3 is a block diagram showing an example architecture for fourth generation/Long Term Evolution cellular broadcast for V2X communication.

For example, for MBMS, a reference architecture is provided with regard to FIG. 3 for LTE-Uu based V2X via MB2.

Specifically, referring to FIG. 3, a UE 310 may communicate with a V2X application server 312 utilizing a V1 reference point. This may be done utilizing, for example, an LTE-Uu interface between UE 310 and E-UTRAN 314.

The E-UTRAN 314 may then communicate with MME 316 using an S1-MME interface and M3 reference point.

Further, E-UTRAN 314 may communicate with the MBMS Gateway 320 utilizing an M1 reference point. MBMS Gateway 320 may further communicate with the MME 316 utilizing an Sm reference point.

A Broadcast/Multicast Service Center (BM-SC) 330 may communicate with MBMS Gateway 320 utilizing an SG mb or SGI-mb reference point.

Further, the BM-SC 330 may communicate with the V2X application server 312 using an MB2-C and MB2-U reference point for the control plane and user plane traffic respectively.

The architectures of FIGS. 2 and 3 may therefore be used for unicast uplink and/or downlink via an infrastructure. In particular, an ITS station such as a vehicle may utilize a Uu unicast uplink and downlink messaging between a V2X application and the E-UTRAN (or other, similar, enhanced Node B (eNB)). Such communication may be directed to the V2X application server, which may be used to deliver data to multiple users in an area using unicast messaging.

In this case, the V2X control function 252 may be used to provision the UE with the parameters needed for V2X communication and the MME 234 may be used to determine whether the ITS station is authorized to use V2X.

With regard to broadcast downlink transmissions via the infrastructure, the V2X application server may support delivering data to an appropriate target area. In this case, the V2X application service supports "network edge" deployment of MBMS. Further, the BM-SC 330 from FIG. 3 above provides functionality to support "network edge" deployment of MBMS.

From FIG. 3 above, the MBMS gateway 320 allows for IP multicast to multiple eNBs or E-UTRANs to allow communications with ITS stations communicating with different e-NBs.

While the embodiments above show an E-UTRAN and EPC, a cellular V2X system in accordance with the embodiments herein is not limited to an E-UTRAN and EPC. For example, the cellular V2X system could be a 5G-NR (New Radio) connected to an EPC, an E-UTRAN connected to a 5GCN (5G Core Network), a 5G-NR connected to a 5GCN, a non-3GPP cellular system, among other options and combinations.

Sidelink Broadcast by Device

In a further embodiment, ITS stations may communicate through side-link communications in cellular V2X. The 3GPP feature on which this communication is based is called Proximity Services (ProSe). The interface is called PC5 and is a type of device to device (D2D) communication.

The term "sidelink" refers to communication that is direct from a device to another device, in contrast to "uplink" which is from a device to a network or "downlink" which is from the network to a device.

Sidelink communications include direct communications between devices, without necessarily involving any infrastructure. In the case of V2X, this could include a first ITS station broadcasting directly to other ITS stations in proximity. In addition, a device can be collocated with an infrastructure node, allowing ProSe communications between a device and an infrastructure node.

Thus, sidelink communications can be done in an autonomous mode, in which no infrastructure components are utilized and transmitting ITS stations autonomously determine when to broadcast to other ITS stations. Alternatively, the sidelink communication can be performed in a scheduled mode in which an infrastructure component such as an eNB may schedule the times at which an ITS station may transmit a message on the PC5 sidelink interface.

Enhancements may be made to ProSe (PC5) for V2X related communications. In particular, both Internet Protocol (IP) and non-IP protocol stacks are supported and include, in some cases, IP version 6 (IPv6). Further, in some cases, non-IP specifications may be used, such as Wireless Access in Vehicular Environments (WAVE) Short Message Protocol (WSPM), as for example defined in IEEE 1609.3, *"IEEE Standard for Wireless Access in Vehicular Environments (WAVE)—Networking Services"*, January, 2016.

V2X related enhancements to PC5 further potentially include the use of Global Navigation Satellite System (GNSS)/Global Positioning System (GPS) signals for synchronization. Further, improvements may include quality of service (QoS) management and congestion control, among other enhancements.

Security in V2X

In V2X communications, there are various security challenges that need to be overcome. A first challenge concerns trust between the ITS stations. In particular, an ITS station may deliberately or unintentionally send out messages with incorrect content. Unintentional messaging may, for example, be based on sensor faults, among other options.

Receiving ITS stations would typically want to avoid acting on incorrect messages. Thus, a vehicle receiving an incorrect ITS message may, for example, unnecessarily apply its brakes, move over, among other options, thereby causing traffic problems or unnecessary delays. In some cases, this may be overcome by doing plausibility checks on information received in V2X messages and comparing such information with information received from the car's own other sensors such as video cameras, LIDAR, RADAR, among other options. However, this is not always possible or may be insufficient.

A further security challenge in V2X deals with privacy. In particular, it may be desirable that no single entity be able to track a vehicle merely through V2X messaging. Thus, road users should be unable to track one another and, further, operators of a Security Credential Management System (SCMS) or wireless network operators should also be unable to track road users. An exception to this would be lawful intercept, as described below.

A further security challenge for V2X is integrity and replay protection. In particular, messages should be unable to be tampered with, for example utilizing a "man in the middle" attack. Messages previously transmitted and replayed should be detected.

A further consideration for security in V2X is non-repudiation. For example, if an accident occurs, senders of messages should not be able to deny that they sent such messages. This is especially true if such messages may be directly or indirectly causal in the accident.

Based on the above, a security credential management system (SCMS) has been and continues to be developed. The system for the US/North America involves a number of parties, including the Crash Avoidance Metrics Program (CAMP) industry consortium, the United States Department of Transportation, the United States National Highway Traffic Safety Administration, IEEE, and the Society for Automobile Engineers (SAE). Such groups have created a solution based on IEEE 1609, which is a series of standards for dedicated short range communications (DSRC), as well as IEEE 802.11p with V2X application layer specifications provided by SAE. Security aspects are standardized in IEEE 1609.2.

The CAMP industry consortium have defined an SCMS that is influencing both proof of concept pilots and work in various standards. Such security design is outlined in general below.

In particular, in a first aspect of security, a V2X message has a particular format. Typically, the V2X message comprises three main parts. The first part is the application message content. The second part is the signature of the message provided by the sending ITS station. The third part of the V2X message is a certificate which is signed by a certificate authority.

The IEEE 1609.2 standard uses Elliptic Curve Qu-Vanstone (ECQV) implicit certificates for V2X communication.

Based on the above, a vehicle or other ITS station could send a message signed with one of its private keys, referred to as a, and the corresponding implicit certificate, including for example (P, info) to the recipient ITS station. In the above, P is the public reconstruction key and info is the administrative information. The recipient extracts the sender's public verification key by calculating $eP+D$, where e=hash(info,P) and D is a trusted copy of the certificate authority's public verification key.

The receiver then uses the sender's public verification key to verify the signature on the message. This is for example illustrated in FIG. 4.

Figure 4:
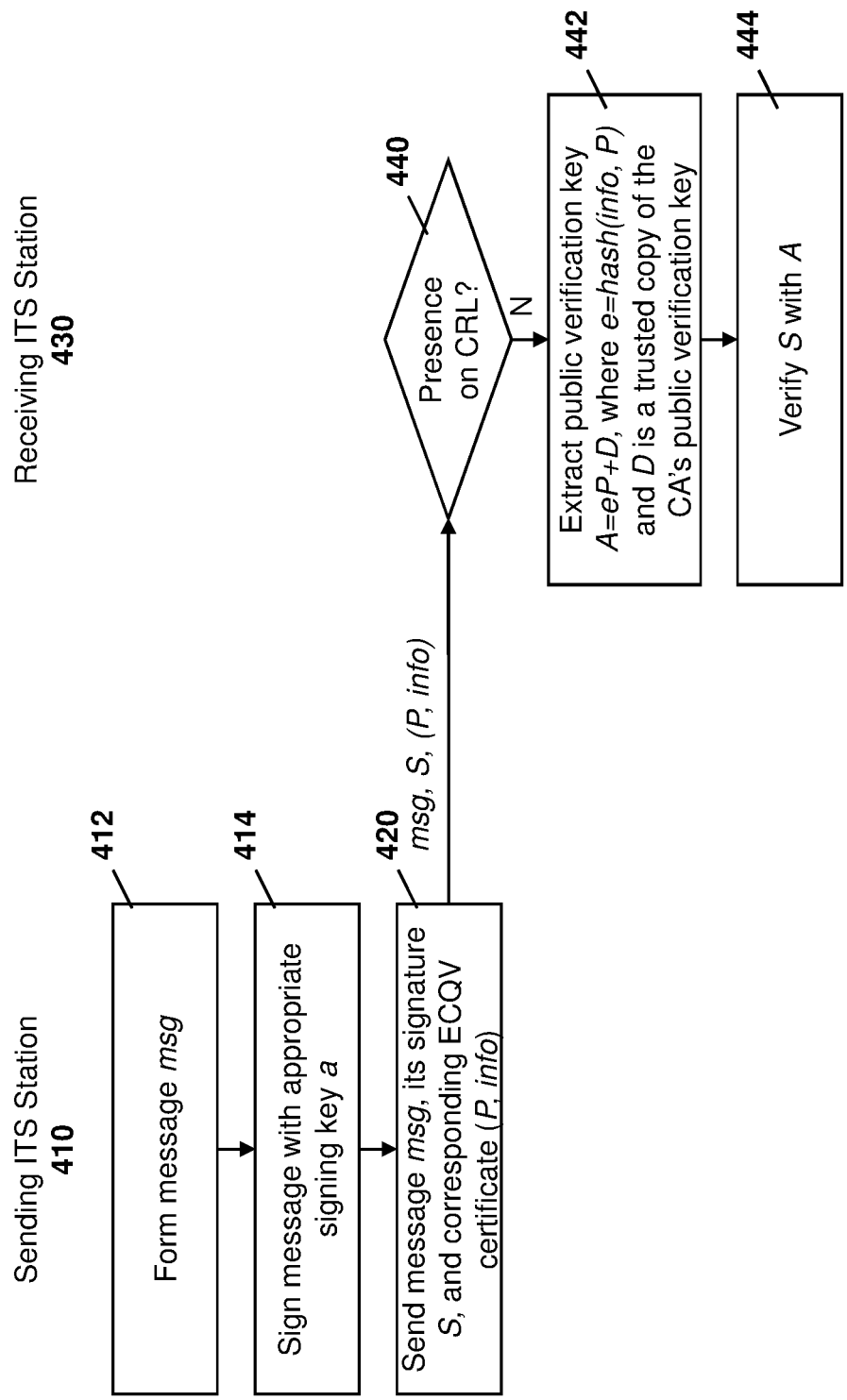
FIG. 4 is a dataflow diagram showing message security using a CRL.

Referring to FIG. 4, a sending ITS station 410 first forms a message at block 412. The sending ITS station then signs the message with an appropriate key a, shown by block 414.

The sending ITS station 410 then sends the message, its signature s, and the corresponding ECQV certificate (P, info) as shown by block 420.

The receiving ITS station 430 may then check a certificate revocation list for the presence of the certificate, as shown at block 440. The certificate revocation list is described in more detail below.

If the certificate is not on the certificate revocation list, the receiving ITS station 430 may then extract the public verification key A=eP+D. This is shown at block 442.

The receiving ITS station 430 may then verify S with A, as shown at block 444.

One issue with the above is that a vehicle with a single static certificate could be tracked by infrastructure network elements or by other road users. To avoid this, an ITS station may be assigned a number of certificates valid for a certain time period, after which such certificates are discarded. For example, a vehicle or other ITS station may be assigned twenty certificates valid within a given week, after which the certificates are discarded. Only one certificate is used at a given time/for a given message to be sent.

An ITS station may cycle through the certificates, using each one only for a certain time period before another certificate is used instead. For example, each certificate may be used for five minutes, after which the next certificate is used. Each certificate further may include a different pseudonym as an identifier. Such use of rotating certificates may prevent the tracking of the vehicle by infrastructure elements.

SCMS and CCMS

European V2X communication technology is standardized by ETSI. Radio layer specifications for such technology is based on IEEE 802.11p, which is referred to herein as "ITS-G5". The V2X application layer specifications are also provided by ETSI.

Security aspects are harmonized with those of the US counterpart, namely IEEE 1609.2. The ETSI have defined the European Cooperative-ITS (C-ITS) Security Credential Management System (CCMS), as well as the C-ITS security policy and certificate policy. This has, for example, been defined in the ETSI Technical Standard (TS) 102 940, "*Intelligent Transport Systems (ITS); Security; ITS communications security architecture and security management*", as for example found in v.1.3.1, April, 2018.

Figure 5:
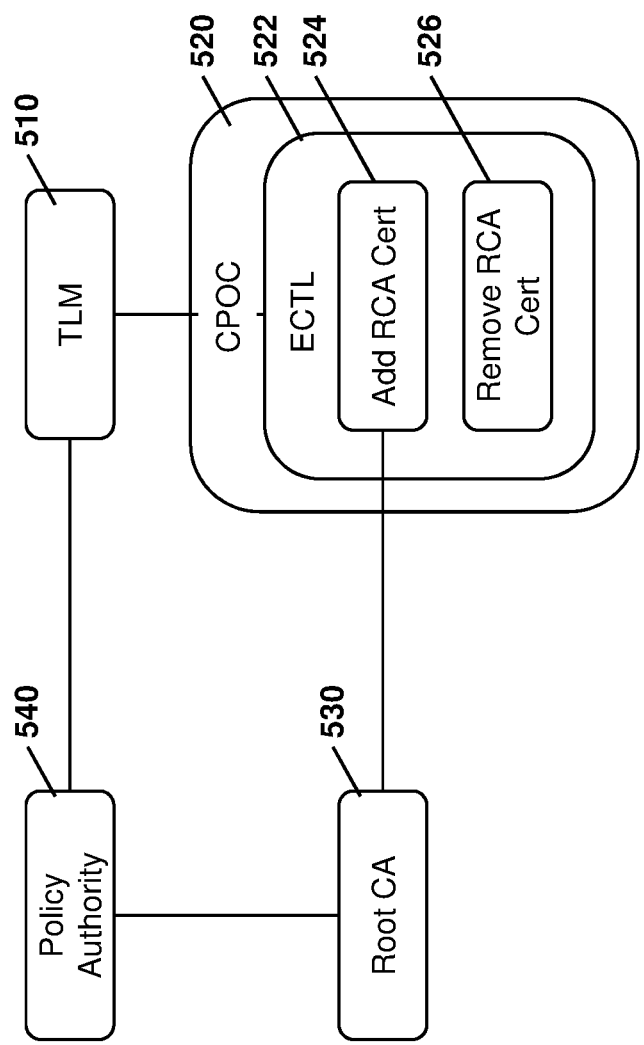
FIG. 5 is a block diagram showing an example European Cooperative-ITS (C-ITS) Security Credential Management System.

In particular, reference is now made to FIG. 5, which shows a CCMS. The system employs a Trust List Manager (TLM) 510. The TLM 510 is a commonly-used trust anchor and endorses or revokes root Certificate Authorities, which are placed on a European Certificate Trust List (ECTL) 522 by the Central Point of Contact (CPOC) 520 associated with the TLM 510. The operation of adding of root CAs to the ECTL is shown at block 524 and the removal of root CAs from the ECTL is shown at block 526.

When a root certificate authority is added, such root certificate authority is for example shown in FIG. 5 with block 530.

The CCMS employs a C-ITS Certificate Policy Authority 540, whose role is to appoint the TLM and confirm that the TLM can trust the root certificate authorities who the policy authority 540 approves to operate. The trustworthiness of the root CAs is captured in the ECTL 522, signed by the TLM 510.

In operation, an Enrolment Authority validates a vehicle and an Authorization Authority provisions a vehicle with temporary short-lived pseudonym certificates used to sign CAM messages. The Enrolment Authority authenticates an ITS-S and grants access to ITS communications. The Authorization Authority provides an ITS-S with authoritative proof that it may use specific ITS services. Both of these authorities draw their trustworthiness from a Root CA vetted by the TLM.

The US Security Credential Management System (SCMS) is similar to the CCMS but contains additional functionality for a misbehavior authority for efficient certificate revocation including linkage authorities. A Registration Authority and Pseudonym Certificate Authority (PCA) are together the equivalent of the Authorization Authority in the CCMS. The Enrolment Certificate Authority is equivalent to an Enrolment Authority.

CTLs

A Certificate Trust List (CTL) is a list of root and trust anchor certificate authorities' certificates. It is usually signed by a trusted authority, so that the recipient of such a list can verify that all the root CAs appearing therein are trustworthy by transitive trust.

CRLs

As described above, certificates can be used to verify data such as data contained in a V2X message. However, certificates can be revoked before their expiry date, therefore receiving entities need to be able to determine that an unexpired certificate has not been revoked. A Certificate Revocation List (CRL) provides a solution for this.

A CRL, in its basic form, is a list of digital certificates whose Certificate Authority (CA) has decided to revoke before the certificates' expiration date/time. CRLs are produced by Certificate Authorities for the certificates under their authority, and need to be distributed to, or fetched by, entities (for example, ITS endpoints) that need to handle certificates issued by that CA. CRLs are typically signed in order to provide integrity and authenticity. Entities receiving certificates need to check to see if the received certificate is indicated in the CRL.

A CRL contains identifiers—namely linkage values that are a cryptographic hash associated with all the V2X pseudonym certificates issued to a vehicle in a time period.

A CRL may be built, in some cases, based on information received from vehicles. Such information may include internal diagnostics from a vehicle and/or may be based on reports to a vehicle from neighboring vehicles. If a vehicle finds that the information in a received message does not match with data obtained from its own sensors, or that it fails some cryptographic or plausibility check, then the originator of the message can be flagged as misbehaving. Vehicles can send misbehavior detection reports to a central entity such as a Misbehavior Authority, which gathers such reports from vehicles over time and makes decisions on what vehicle certificates to place on or remove from the CRL.

CRLs and CTLs may be distributed to the various ITS endpoints/stations.

For the EU CCMS, CTLs can be disseminated from a central CTL (CCTL). Such CCTL contains Root CA certificates and is provided as a protected file by a central Distribution Center (DC), called Central Point of Contact (CPOC). Every root CA has their own DC, whose URL is provided in the CCTL entry for that Root CA. Every Root CA publishes, via the DC, the following: its own CTL containing all certificates of subordinate certificate authorities such as PCAs; and their own CRL.

To ensure that the vehicles connected to this DC get a complete and current list of trusted Root CAs and CRLs, each of those DCs regularly checks for an updated CCTL. For each other Root CA on the CTL, the Root CA at hand retrieves the corresponding CTL and CRL (or their updates) from its peer. In this way, each DC will always have all current CTLs and CRLs available.

ITS endpoints that are enrolled under the root CA will download these files from their Root CA's DC.

There are two approaches in the V2X system to disseminate a CTL and CRL to all devices in the system in the case of a CA or an endpoint ITS Station entity certificate needing to be revoked. A first is from a DC, which provides a single CTL containing all Elector, Root CA and PCA certificates, as well as all Root CA issued CRLs, to all devices in the system. A second is via a decentralized approach, whereby each Root CA employs its own DC and provides necessary CTLs and CRLs to devices enrolled in its hierarchy, as well as to other peer Root CA DCs.

Lawful Interception

Lawful interception (LI) is defined herein as "lawfully authorized interception and monitoring of telecommunications pursuant to an order of a government body, to obtain the forensics necessary for pursuing wrongdoers." This definition comes from the ITU-T Technology Watch Briefing Report Series, No. 6, May 2008.

Intercepting communications data is lawful only if it is done according to relevant regional laws, following procedures and authorization from given authorities. Typically, a national Law Enforcement Agency (LEA) issues an order for an LI to a specific network operator, access provider, or network service provider, which is required by law to make available the requested information concerning a certain target device associated with a specific person, to a Law Enforcement Monitoring Facility (LEMF).

In some cases, the LI system provides transparent interception, so that an intercept target (user) is not aware of the process taking place. In other cases, the intercept target may become aware that the process is taking place.

Figure 6:
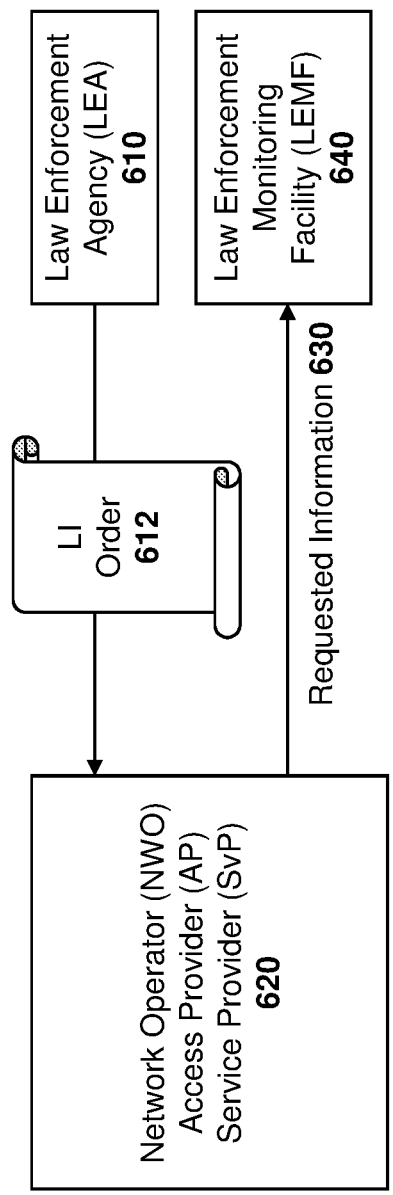
FIG. 6 is a block diagram showing a high-level overview of lawful interception components and processes.

For example, a high-level architecture for the interception process is shown with regard to FIG. 6. The embodiment of FIG. 6 is adapted from the ITU-T Technology Watch Briefing Series, No. 6.

In the embodiment of FIG. 6, an LEA 610 wishes to monitor a target. In this regard, the LEA obtains an LI order 612. The LI order 612 may be for various types of data including contents of communications (CC), which includes video, audio, or text message contents, among other such information.

In other cases, the LI order 612 may seek to obtain Intercept Related Information (IRI) or Call Data (CD), which includes information on the communication itself. Such information includes signaling information, source and destination information such as telephonic numbers, IP or MAC addresses, among other such data. Further, the information may include the duration, time and date of the communications. On mobile networks, it is possible to trace the location from where the call was placed.

The LI order 612 is provided to a network operator, access provider or service provider 620, which may then lawfully intercept the communications, including either the content of the communications or intercept related information, depending on LI order 612. The requested information is then provided through messaging 630 to the Law Enforcement Monitoring Facility 640.

Based on the above, lawful intercept is a process with three steps. A first step includes the capture of information. Either or both of the CC or IRI related to the intercept target(s) are obtained from the network.

A second step is to filter the information. Information related to the target that falls within the topic of inquiry is separated from other gathered information and formatted for a given delivery format.

A third step is delivery. The captured information in its formatted state is delivered to the LEMF 640.

Detailed mechanisms for lawful intercept have been standardized in the Third Generation Partnership Project (3GPP), and such mechanisms are for example described in the 3GPP TS 33.106, "3G security; Lawful interception requirements", for example v.15.1.0, June 2018, 3GPP TS 33.107, "3G security; Lawful interception architecture and functions", for example v. 15.5.0, March 2019, and 3GPP TS 33.108, "3G security; Handover interface for Lawful Interception (LI)", for example v. 15.4.0, March 2019 for 4G; and in 3GPP TS 33.126 "Lawful interception requirements", for example v.15.1.0, December 2018, 3GPP TS 33.127, "Lawful interception architecture and functions", for example v. 15.1.0, March 2019, and 3GPP TS 33.128 "Security; Protocol and procedures for Lawful Interception (LI); Stage 3", for example v. 15.0.0, March 2019 for 5G.

3GPP Cellular Access

A UE wishing to use cellular data connectivity or services may make use of 3GPP cellular IP/packet switched access for point-to-point and point to multipoint. For example, the data connectivity may use at least one Evolved-Universal Mobile Telephony System (UMTS) Terrestrial Radio Access Network (E-UTRAN), Enhanced Packet Core (EPC) and a Packet Data Network (PDN). The combination of an E-UTRAN and an EPC is known as an enhanced packet system (EPS). For a 5G system, this comprises of one or both of a Next Generation (NG) radio and NG core network.

Figure 7:
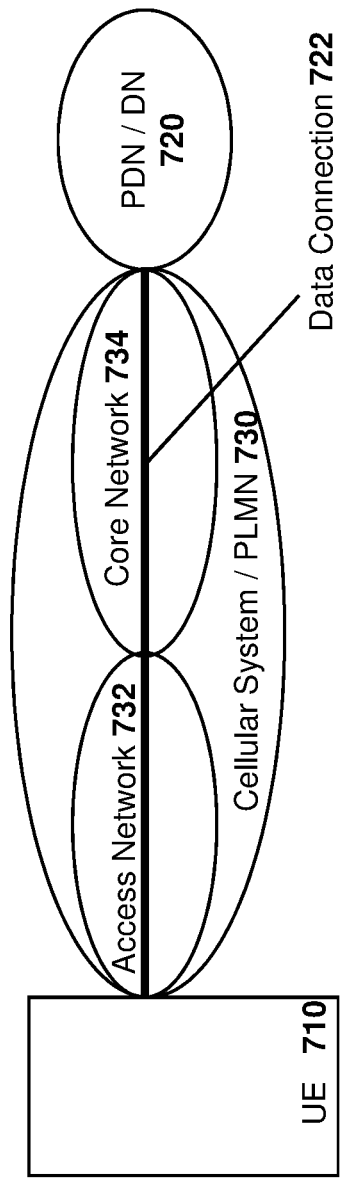
FIG. 7 is a block diagram illustrating a data connection using a cellular system.

Reference is now made to FIG. 7. In the example of FIG. 7, UE 710 connects with a PDN/Data Network (DN) 720 utilizing a data connection 722. Such data connections may, in some embodiments, be referred to as packet data protocol (PDP) contexts in second generation (2G) or third generation (3G) networks, or referred to as Packet Data Unit (PDU) sessions or 5GS QoS flows in fifth generation (5G) networks. Data connection 722 may be used to transmit and receive data such as signaling or control plane data, user plane data, voice/audio media, video media among other data options, between the UE 710 and PDN/DN 720. A PDN/DN provides a mechanism for a UE to communicate (i.e. send and receive data) with other entities connected to or via the PDN.

Data connection 722 is typically over an Access Network 732 and Core Network 734, as provided in FIG. 7. Access Network 732 may be an E-UTRAN in some cases and Core Network 734 may be an EPC in some cases. However, in other embodiments the connectivity may be over a wireless local area network (WLAN) and an EPC, and the present disclosure is not limited to a particular data connection 722.

The Access Network 732 and Core Network 734 typically, but not always, belong to a mobile network operator or cellular carrier, whereas the PDN/DN 720 may belong to a mobile network operator or other entity. For example, the PDN/DN may belong to a corporation or an enterprise network.

Cellular system 730 may consist of only a Home Public Land Mobile Network (HPLMN) ($1^{st}$ service provider) or may further consist of an HPLMN and a Visiting Public Land Mobile Network (VPLMN) ($2^{nd}$ service provider), with the latter being used for roaming. Such HPLMN and VPLMN are not shown in FIG. 7 for brevity.

Cellular system 730 may consist of various entities. These include one or more of an enhanced Node B (eNB), Mobile Management Entity (MME) Serving Gateway (S-GW), PDN Gateway (P-GW), or Home Subscriber Server (HSS), among other network nodes.

Data connection 722 provides a path for data between a UE 710 and a PDN/DN 720. During PDN connection establishment, the PDN/DN 720 is identified by an Access Point Name (APN) or a Data Network Name (DNN), and thereafter by other parameters in the established PDN/DN connection. The APN can identify a gateway node (e.g. Packet Gateway (P-GW), a Gateway General Packet Radio Service (GPRS) Support Node (GGSN)), among others, in the Core Network 734 that allows access to the PDN/DN 720.

Lawful Intercept in 3GPP Cellular Network Operator

The embodiments of FIGS. 6 and 7 above can be utilized within a 3GPP cellular network operator's system. For example, reference is now made to FIG. 8.

Figure 8:
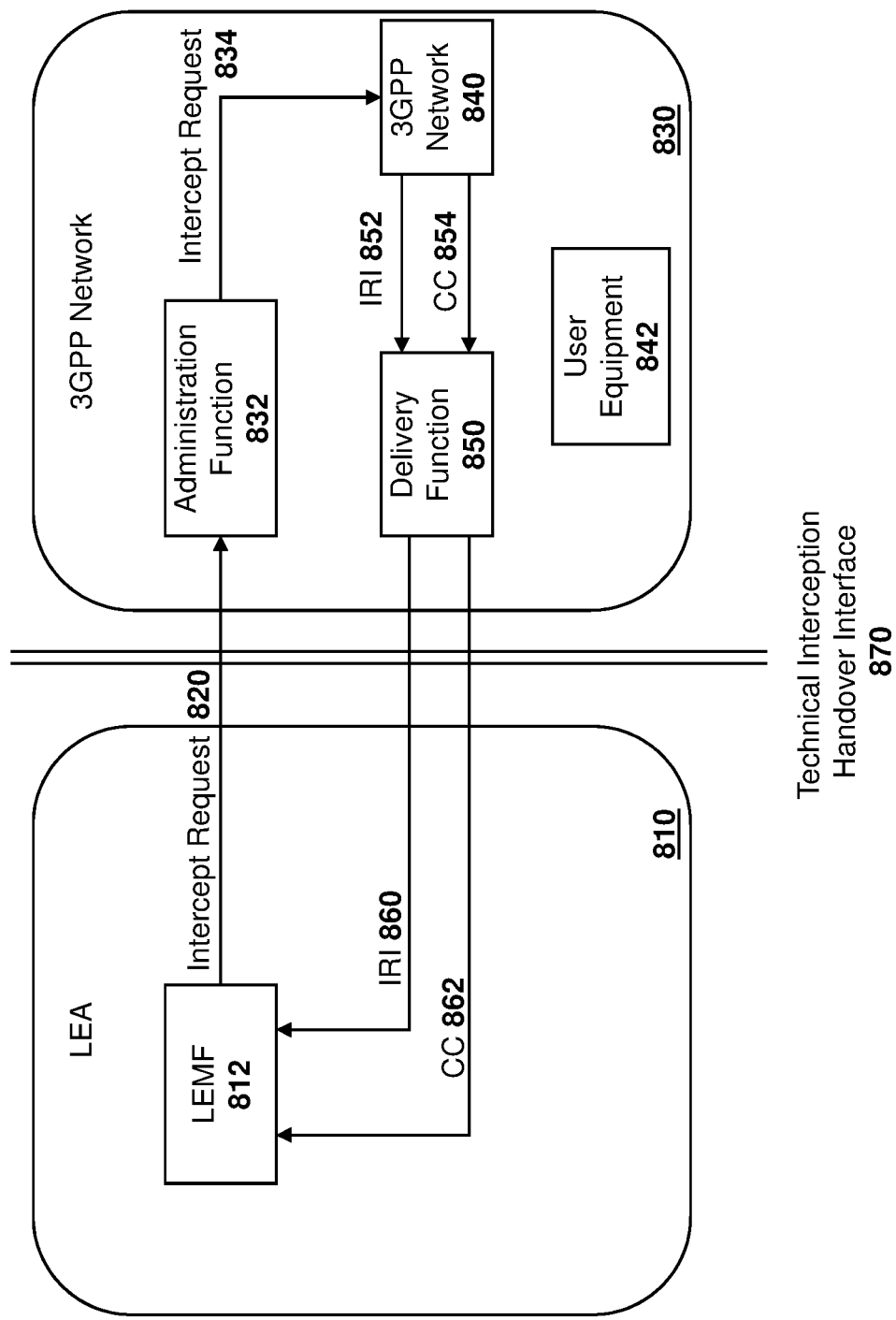
FIG. 8 is a block diagram showing a lawful interception system using a 3GPP cellular network operator network.

In the example of FIG. 8, an LEA 810 includes an LEMF 812. The LEMF 812 may send intercept orders 820 to an administrative function 832 of the 3GPP network 830.

The administration function 832 forwards the interceptor request, shown as intercept request 834 to a 3GPP network node 840. The 3GPP network node 840 typically contains intercept functions to gather the required data. The gathered data typically consists of two types of information, namely CC and IRI, as described above.

The gathered IRI information regarding a user equipment 842 is sent to a delivery function 850, as shown by message 852. The gathered CC information regarding user equipment 842 is sent to delivery function 850, as shown by message 854.

Delivery function 850 then, in turn, delivers the formatted IRI information using messaging 860 to LEMF 812. Similarly, the delivery function 850 returns CC information in messaging 862 to LEMF 812. Messaging 860 and 862 is sent across a typical interception handover interface 870.

As detailed in the 3GPP TS 33.106, the interception system needs a means of identifying the target and all other parties of the targeted communications. Operators intercept communications based on long-term or permanent identifiers associated with a target service or equipment, as identified by the LEA. To achieve interception, the operator may need to translate these identifiers to further associated identifiers in order to identify the data to be intercepted. Target identities are target service and equipment associated with the target use or any derived identifiers from such elements. Examples of target service identities are International Mobile Subscriber Identity (IMSI), Mobile Station International Subscriber Directory Number (MSISDN), Network Access Identifier (NAI), telephone Uniform Resource Identifier/Uniform Resource Locator (tel URI/URL), Session Initiation Protocol (SIP) URI, among others. Examples of target equipment identities are International Mobile Equipment Identity (IMEI), IMEI Software Version (IMEISV), Media Access Control (MAC), among other options.

V2X Based Vehicle Location Tracking

While the above mechanisms provide for general V2X communications and for lawful interception of cellular communications and related aspects, in some cases it would be useful to use V2X systems for lawful interception. Therefore, in accordance with the embodiments of the present disclosure, another mechanism for performing lawful intercept of vehicle location, utilizing V2X communications, is described below.

In particular, in accordance with a first scenario of the present disclosure, it is desirable for certain entities such as law enforcement agencies to be able to track the location of vehicles, potentially over a specific period of time, without the occupants of the vehicle being aware that such tracking is taking place. Occupants of the vehicle could include both the driver and passengers. For example, a use case where this would be implemented would be the theft of the vehicle being reported by the registered owner. The stolen vehicle may then need to be located without tipping-off the occupants (e.g. the driver) of the stolen vehicle.

In a further scenario, unlike cellular lawful intercept, in some cases it may be acceptable that a vehicle occupant (e.g. driver) finds out that the vehicle is under surveillance. For example, if the vehicle is reported to have been involved in a major incident such as police officer hit-and-run, a child abduction, among other such scenarios, and the whereabouts of such a vehicle are unknown, the public may be asked to help to locate it. In this case, it is possible that the driver of the reported vehicle may find out that the vehicle is being sought through public assistance.

Solutions solving both scenarios are described below.

The embodiments of the present disclosure utilize V2X (e.g. V2V and V2I) communication technologies for lawful intercept of vehicle position. Where V2X systems are deployed, vehicles generally will broadcast messages periodically that contain the current position of the vehicle, for example with the goal of increasing road safety. Such message may be a CAM or BSM message as described above.

When a CAM or BSM message is received, the receiving ITS station/vehicle checks the message for plausibility and verifies its cryptographic protection, which involves checking the certificate against a CRL received and stored at the receiving ITS station from a trusted server in the network.

Similar to a CRL, in accordance with the embodiments described herein, another list of vehicles could be distributed and stored on all or a subset of receiving ITS stations, such additional list being referred to herein as the Target Vehicle List (TVL). Like a CRL, the TVL contains identifiers associated with V2X communications pseudonym certificates issued to one or more target vehicles.

In some cases, the TVL may be built from a law enforcement agency's interaction with other entities, such as the vehicle Original Equipment Manufacturer (OEM) V2X system manager, via a new LI V2X communication authority, referred to herein as a Lawful Tracking Authority (LTA). The TVL may then be distributed to a set of one or more V2X endpoints in the V2X system.

The one or more of V2X endpoints may be limited in terms of both identity and geographic area.

Subsequently, upon reception of V2X messages by V2X endpoints, the receiving V2X endpoint may check the pseudonym certificate of the received V2X message against the TVL. If there is a match, then the receiving V2X endpoint that detected the match may send a message, referred to herein as a Target Vehicle Sighting Report (TVSR) to another entity such as an LTA. The entity to which the TVSR is sent may, in some cases, be the same entity as the entity that distributed the TVL. In other cases, the two entities may share ownership of the TVL.

The entity that receives the TVSR may gather and aggregate the received TVSR with other received TVSRs, or it may send some or all of the TVSRs to other entities for aggregation. Such other entities may, for example, include a different LTA, a central LTA, among other options.

Once the TVSRs are aggregated, the entity that has aggregated the TVSRs may then draw certain conclusions from the aggregated TVSR information. Such conclusions may include the location of the vehicle at certain points in time, its travel path, among other such information. The aggregated TVSR information may then be sent by the aggregating entity to any other entity such as the LTA, an LEMF, among other options.

In order to track a suspect vehicle's position over time as it moves, V2X endpoints can be configured to keep transmitting TVSRs with some frequency sufficient for TVSR receiving entities to map the journey of the suspect vehicle over a period of time.

In the above, the V2X endpoint receiving the TVL may be all or a subset of V2X endpoints within a geographic area. For example, if the target vehicle is not to know about the tracking, the V2X endpoints receiving the TVL or capable of decrypting a TVL may be limited to emergency vehicles or other trusted vehicles or infrastructure units such as road side units, among other options. In other cases, if the vehicle being tracked may know about the tracking status, the TVL may be sent to all vehicles within a geographic area or to a subset of vehicles depending on an anticipated route for the vehicle being tracked, among other options.

Figure 9:
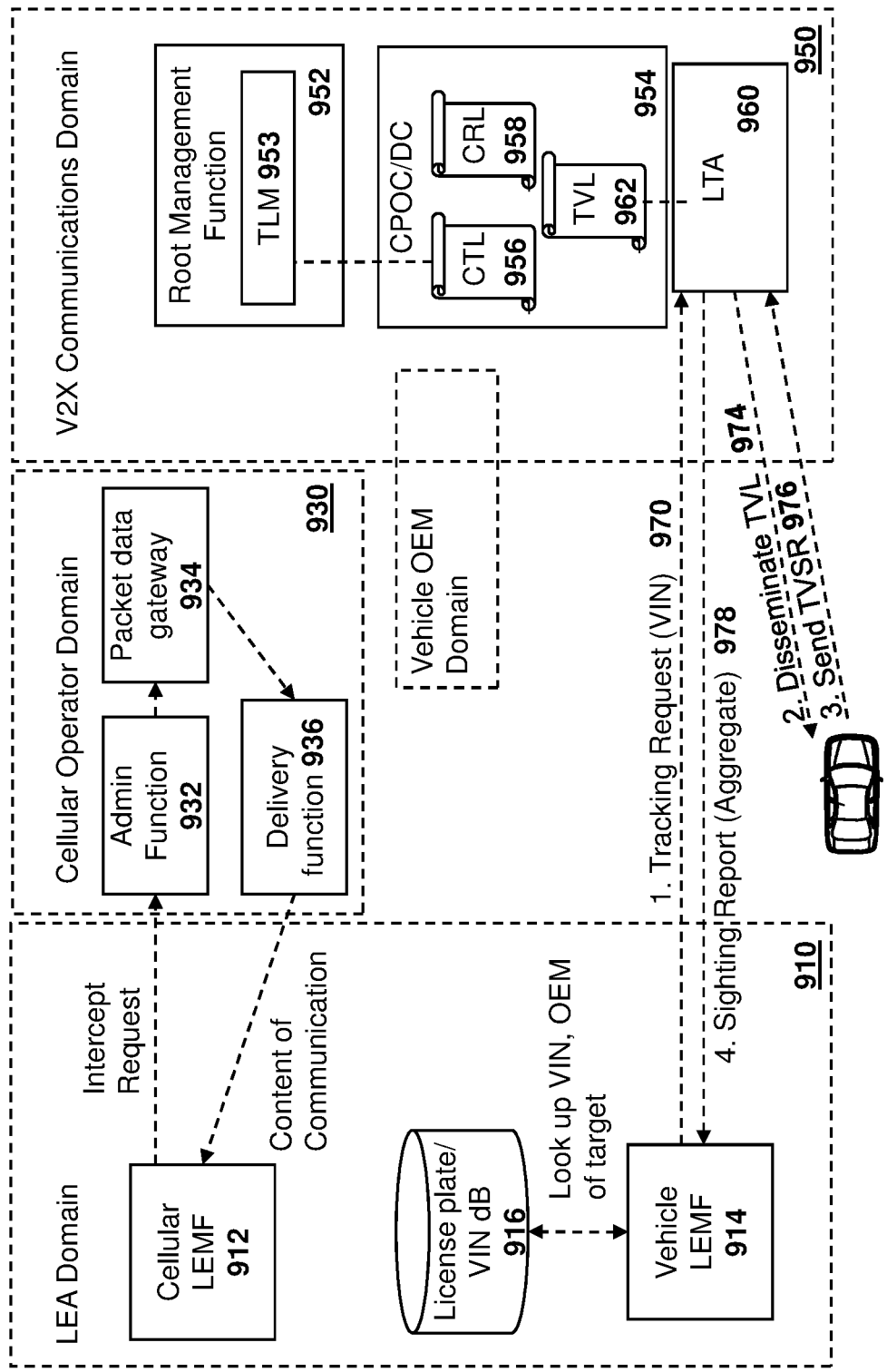
FIG. 9 is a block diagram showing system components and processes for lawful interception having a centralized lawful tracking authority.

Reference is now made to FIG. 9, which shows a system in accordance with one embodiment of the present disclosure. In particular, the embodiment of FIG. 9 deals with a centralized LTA. In other cases, LTAs may be distributed, and a distributed embodiment is discussed below with regard to FIG. 10.

Figure 10:
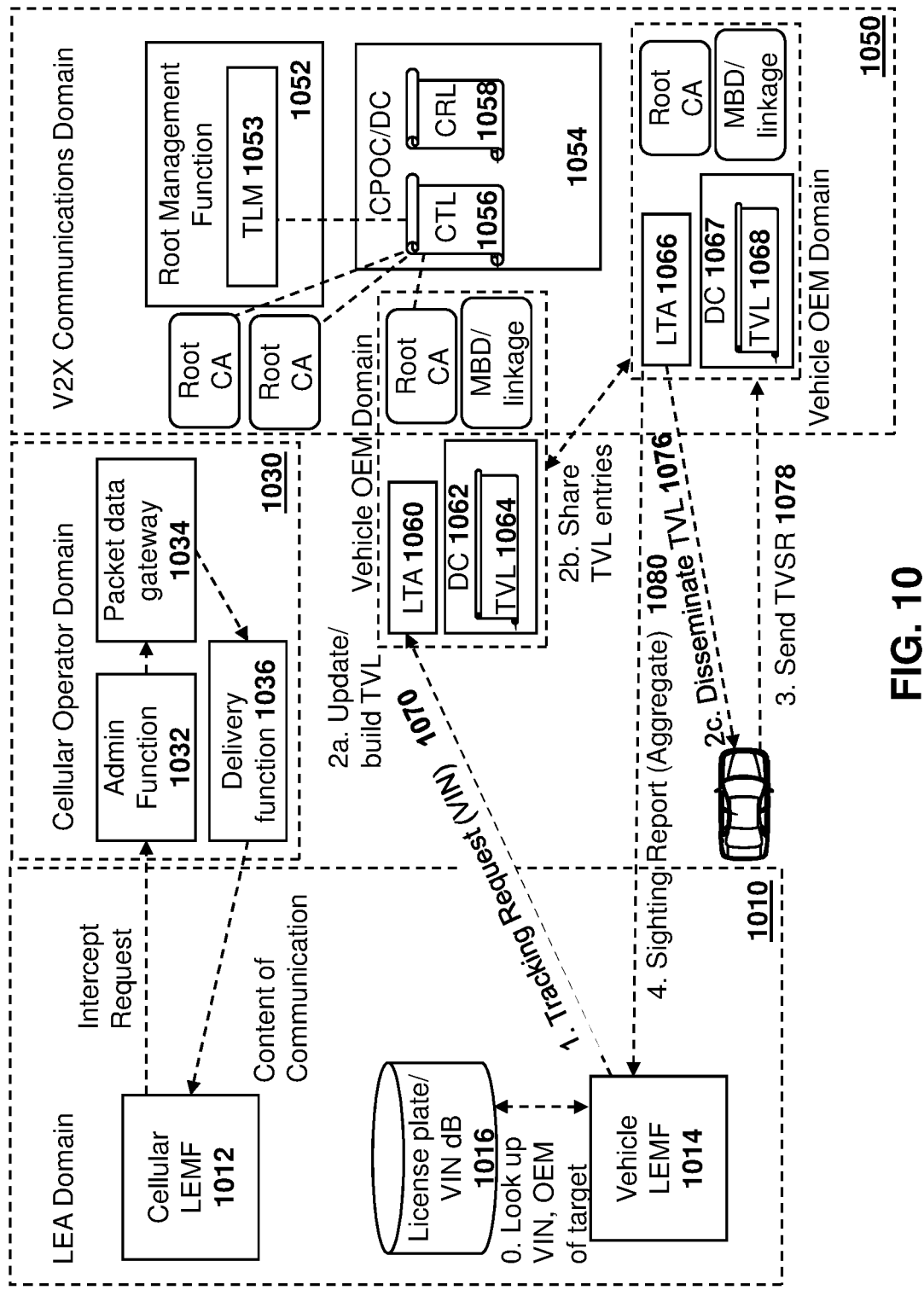
FIG. 10 is a block diagram showing system components and processes for lawful interception having distributed lawful tracking authorities.

An LTA is a logical function or plurality of functions in V2X. In particular, the LTA is a V2X communication and domain function handling lawful tracking. The LTA can be global, as shown in FIG. 9, or can be distributed, such as being OEM specific in some cases, as shown in FIG. 10.

The LTA is located in the network along with security provisioning functionality, such as a Registration Authority. The LTA functions to some extent as a Misbehavior Authority. It interfaces with a law enforcement agency to run LEMF, builds and disseminates TVLs, processes TVSRs, and builds aggregate TVSRs to periodically send to LEMFs in response.

The LTA can be run by an OEM in its own CCMS or SCMS component network, or can be a centralized function. The LTA can be broken down into logically separate functions according to duty. Specifically, one or more of the following logical functions could be implemented in an LTA.

A first logical function for an LTA is a receiver of a tracking request from LEMFs.

A second logical function for an LTA is as a builder of TVLs from various LEMFs over time.

A third logical function for an LTA is as a disseminator of TVLs. TVL dissemination can however be offloaded to a DC, similar to what is done for a CTL and a CRL.

A fourth logical function for the LTA is as a receiver of TVSRs from vehicles.

A fifth logical function of an LTA is potentially as a builder of aggregate TVSRs.

A sixth logical function of an LTA is a sender of an aggregate TVSR to the LEMF. However, this sixth logical function may be the part of the first logical function.

Therefore, referring again to FIG. 9, an LEA domain 910 includes a cellular LEMF node 912 which functions for lawful intercepts for cellular communications. In particular, the cellular LEMF node 912 may send an intercept request to an admin function 932 within a cellular operator domain 930. The admin function may provide data to the packet data gateway 934, which may then provide communication information to a delivery function 936. Content or other details of the communication can then be provided from delivery function 936 back to the cellular LEMF node 912, depending on the lawful intercept order.

Similarly, a vehicle LEMF node 914 may be used for lawful intercept using V2X communications. In particular, the vehicle LEMF node 914 may access a license/number plate or Vehicle Identification Number (VIN) database 916 to look up the VIN and the manufacture of the target vehicle. For example, this may be done when a warrant for a certain license plate or VIN information is received at the vehicle LEMF node 914. The LEMF knows the vehicle make of the suspect or target vehicle and it may take a VIN from the interception warrant and put them in the tracking request.

The vehicle LEMF node 914 may then send a tracking request 970 to LTA 960 in the embodiment of FIG. 9. LTA 960 is within V2X communications domain 950.

Further, in the embodiment of FIG. 9, V2X communications domain includes a root management function 952 having a TLM 953. The CPOC/DC 954 includes a CTL 956, a CRL 958, and a TVL 962.

LTA 960 provides a central TVL 962, which may be updated based on the tracking request received in message 970. The TVL is to be disseminated by the CPOC/DC 950. The receiving LTA may look-up the Enrolment Certificate (EC) associated with the target. This information may require the cooperation of, or communication with, an OEM function in a centralized model. If the linkage authorities are employed, then the LTA may ask the linkage authorities to provide the pre-linkage values of the certificates issued to that EC. The LTA can compute the linkage values from pre-linkage values, as already done for CRLs.

Alternatively, if linkage values are not used, then the LTA may ask the Registration Authority or the PCA or the Authorization Authority to provide the hashed values for at least some of the certificates that have been issued to the target vehicle with the EC.

Once the TVL is updated, the TVL can be disseminated/sent to the various V2X endpoints, as for example shown with message 974. In particular, the TVL is compiled with various entries for the target vehicle. These entries include the linkage value or list of the hash ID of the pseudonym certificates assigned to the vehicle and/or a set of one or more vehicle characteristics such as the license plate, make/model and color of the vehicle.

The dissemination of the TVL may be done, for example, similarly to the propagation of a CRL. In particular, both push and pull mechanisms for any V2X endpoint may be used to allow a V2X endpoint to download or obtain the TVL. In other cases, the TVL can be distributed via peer to peer messaging, between vehicles, similar to the certificate authority certificates that the "Point to Point Certificate distribution protocols" use.

TVL 962 is similar to a CRL as described above. In particular, the TVL contains identifiers such as linkage values or hash IDs of some or all V2X communication temporary pseudonym certificates issued to a target vehicle. To build such a list, the LTA interfaces with other LTAs, vehicle OEM, and/or other V2X communication authorities that are needed to arrive at a list of linkage values for a set of certificates. For example, such other authorities may include a Misbehavior Authority or the PCA, Registration Authorities (RAs) or Linkage Authorities (LAs).

The TVL is distributed to one or more V2X endpoints of V2X system. As indicated above, there are two possible modes of distribution. In a first mode, the TVL is made available to all vehicles in an area. This is an "amber-alert" like LI system, where the target vehicle may find out that is being sought. In this mode, the TVL and CRL may be the same, with additional information provided in the combined list to differentiate entries in the list being a target vehicle (i.e. equivalent to an entry in a TVL) or a vehicle whose certificate has been revoked (i.e. equivalent to an entry in a CRL) or both a target vehicle and a vehicle whose certificate has been revoked.

In a second mode, the TVL may only be distributed to certain authorized V2X endpoints. For example, such authorized V2X endpoints may be emergency vehicles such as police cars, or other non-commercial vehicles, roadside units, or a combination of authorized vehicles and roadside units, among other options. This would be more of a traditional LI system where the target needs to remain unaware that it is being tracked.

Further, a TVL may be encrypted with a key, and the encrypted TVL may only be decrypted by an authorized V2X endpoint. Thus, the contents of the TVL may not be generally available to all V2X endpoints. In this case, key distribution to authorized V2X endpoints and the encryption of the TVLs may be done according to standard mechanisms for encryption distribution.

In systems where the TVL is limited to a geographic area where the target vehicle is expected to be located, vehicles may need to download a local TVL once the vehicle moves into a different geographic area. The local TVL may have different entries from TVLs received while in previous geographic areas.

The TVL could include data related to one or more target vehicles. The TVL can sometimes also contain, for each of its entries, the desired frequency with which updates should be sent (e.g. in case the target vehicle is sighted by the V2X endpoint), and an expiration time when location information is no longer needed i.e. when the vehicle should cease sending updates.

Further, in some cases the TVL can be distributed to a target vehicle. This is unlike a cellular lawful intercept system design, which aims to achieve LI without tipping off target users. However, target vehicles receiving a TVL that includes data related to them may still be acceptable in some cases. For example, the vehicle occupants may still be unaware of the V2X communication targeting the vehicle that the suspect is driving. The action of hiding such information from vehicle occupants may be enabled by default as a feature of the V2X module within the vehicle.

In other cases, it may be difficult to disable such functionality, for example in markets where V2X communication is mandated.

Further, in some embodiments, if a vehicle determines that some data contained within a received TVL pertains to itself, then the vehicle could take various actions, depending on whether the TVL is distributed in the first or the second mode. In some cases, a vehicle receiving a TVL pertaining to itself may increase or decrease the frequency of which some V2X messages such as the BSM are sent. In other cases, the vehicle V2X system may establish a cellular data connection as described above. The target vehicle may send over the established data connection, over the V2X system, over other communications such as Bluetooth, among other options, additional data such as images, video, etc. Such additional data may give information relating to vehicle occupants, surroundings of the vehicle, among other information.

In some cases, if a target vehicle receives at a TVL with its own identifying information in it, the vehicle may take some physical-related action e.g. lock its doors, disable all of its keys or tokens, flash its lights, sound its horn, etc. This may, in some cases, be restricted to be performed when the vehicle is stopped or may be restricted to functionality for outside the vehicle such as disabling outside handles from operating/opening doors.

In other cases, a target vehicle receiving a TVL with its identifier in it may restrict certain systems or aspects of the vehicle. For example, the target vehicle may enable a specific mode of the vehicle such as economy driving mode, disable specific modes of the vehicle such as sports driving mode, among other options.

Referring again to FIG. 9, a V2X endpoint receiving the TVL in message 974 may look for the target vehicle. For example, when a vehicle or RSU operates in a V2X communication mode, and has a non-empty TVL, the V2X endpoint may check the certificate of each received V2X safety message against the TVL and/or engage a camera or other relevant sensor to look for a match in the vehicle characteristics listed in the TVL. A match may be obtained using the V2V safety message and/or camera or sensor imaging or both. For example, it is possible to associate a given received V2X message with a certain vehicle that is detected via sensors to be a neighboring vehicle.

If the target vehicle is spotted/detected, the V2X endpoint may send a TVSR, as shown by message 976. The TVSR is sent to LTA 960. For example, in one embodiment, the TVSR can have the following entries for each sighting: an identifier of a target vehicle such as the V2X certificate or one or more temporary pseudonym certificates; a license plate number, for example determined using automatic license/number plate recognition; and/or position information. Optionally the TVSR may also include one or more of the V2X messages received from the target vehicle; images and/or video relating to the target vehicle that may include one or more vehicle characteristics such as the license plate, color, make and model; among other information. The images may be captured, for example, utilizing a camera or other sensor on the V2X endpoint.

The vehicle identifier may be optional if the target vehicle is not sending the V2X messages and was only detected by the camera or other sensors. In this case, some of the information described above may be omitted.

The V2X endpoint can send the TVSR with one or more entries to a central LTA for the embodiment of FIG. 9.

A TVSR is similar to a misbehavior detection report. The TVSR report message typically contains an identifier of the suspected vehicle. The identifier may, for example, be a V2X certificate such as a temporary pseudonym certificate, a license plate number for example determined using automatic license plate recognition, and/or position information. Similar to a MBD report, the TVSR may be encrypted end to end between the vehicle and the LTA server.

The TVSR message may contain additional information, or alternative information, to the identifier of the target vehicle and position information. For example, such additional or alternative information may include one or more of the V2X messages received from the target vehicle. Such one or more V2X messages generally contain all information that is relevant for a vehicle, including the identifiers, location, among other information, as per existing V2X specifications.

In other cases, the TVSR may contain the location of the target vehicle as determined by vehicle sensors, for example.

In other cases, the TVSR message may contain images and/or video relating to the suspect vehicle. Such images may be captured from a camera associated with the TVSR sending V2X endpoint in some cases. The images may include one or more vehicle characteristics such as a license/number plate, color, shape, among other information.

In other cases, the TVSR may contain the actual determined vehicle characteristics as determined by sensors and associated processing at the V2X endpoint. Such characteristics may include license/number plate, vehicle make, vehicle model, vehicle color, vehicle shape, among other information.

The inclusion of the V2X related information assumes that the TVSR sending V2X endpoint receives a V2X message from the target vehicle. If no V2X messages are received from the suspect vehicle, for example because the target vehicle does not broadcast V2X messages, then the TVSR sending V2X endpoint can still include non-V2X information such as images, video, position information, among other information in the TVSR message. Various reasons for a target vehicle not broadcasting V2X messages may be that the vehicle does not have that functionality enabled, that the target vehicle has had the functionality disabled, among other options.

One advantage of reporting V2X related information, whether or not the TVL contained the V2X certificate data or not, is that this may help the V2X system authority such as the LTA find other temporary certificates of the target vehicle and/or a linkage value to update the TVL entry, so that any other vehicle at a future point in time can determine whether the target vehicle is located nearby. The other temporary certificates may be those that will become valid in the near future as described above with regard to CRL.

In the embodiment of FIG. 9, once the LTA receives the TVSRs from various V2X endpoints, it can aggregate the sighting report and send a sighting report aggregated message 978 to the vehicle LEMF node 914. In particular, the LTA may wait to receive TVSRs from several V2X endpoints before compiling a local TVSR.

In the embodiment of FIG. 9, the central LTA may have received TVSRs from a plurality of V2X endpoints. Several V2X endpoints may report a given target vehicle, and the information for the target vehicle may have been collected at different points in time and space. The central LTA that received the tracking request and compiled the TVL can now compile the overall sighting reports to send a response to the tracking request.

In some cases, there may have been no TVSR received pertaining to some vehicles on the TVL, and thus the aggregated sightings report will contain no information about those target vehicles.

In the embodiment of FIG. 9, the TVL may be generated per region, and the list itself should be digitally signed by a trusted authority such as the LTA, or another authority that the vehicles receiving the TVL already trust or can come to trust. In some cases, the TVL may be empty or may contain one or more target vehicles. For each target vehicle, the TVL may contain information such as the license/number plate, make and model, color and size the vehicle, and/or the V2X pseudonym certificate and linkage values or hash ID of several current certificates if no linkage values are available, among other information.

The LEMF, once it receives report 978, may take due action given the information for one or more sighted suspect vehicles.

While the embodiment of FIG. 9 shows a centralized solution, in an alternative embodiment, a decentralized solution for LTAs may be provided. For example, in the embodiment of FIG. 10, each vehicle OEM has a domain which includes an LTA within such domain. However, in other cases, LTAs may be distributed in other ways rather than per OEM, and the use of OEM LTAs is merely provided as an example.

Referring to FIG. 10, the LEA domain 1010 includes the cellular LEMF node 1012, along with vehicle LEMF node 1014. The vehicle LEMF node 1014 may communicate with a license plate/VIN database 1016 to look up at the VIN and OEM information of a suspect or target.

As with the embodiment of FIG. 9, the cellular LEMF node 1012 may communicate with the cellular operator domain 1030. In particular, the cellular LEMF node 1012 may send an intercept request to the admin function 1032. Such intercept request may be passed to the packet data gateway 1034 which may collect information and provide that information to a delivery function 1036. The content of the communication may be then aggregated and returned to the LEMF cellular node 1012.

In the embodiment of FIG. 10, a V2X communication domain 1050 includes a root management function 1052 which has a TLM 1053.

Further, the V2X communication domain 1050 includes a CPOC/DC 1054 having the CTL 1056 and CRL 1058.

However, in the embodiment of FIG. 10, each vehicle OEM has its own domain and its own LTA. In particular, a first vehicle domain associated with the target vehicle has an LTA 1060, DC 1062, TVL 1064, as well as a root certificate and an MBD/linkage agent. Similarly, a vehicle OEM associated with a V2X endpoint has an LTA 1066, DC 1067, TVL 1068 as well as its own root certificate authority and MBD/linkage agent. The OEM domain DC may also contain the OEM-specific or central CTL and CRL.

Once the vehicle LEMF node 1014 looks up the VIN and OEM of the target, it may send a tracking request 1070 to the respective LTA 1060. In this case, the OEM itself can look-up the EC, rather than a central LTA.

The LTA 1060 may then update or build the TVL 1064 and share its TVL entries, for example with LTA 1066. In particular, in a decentralized architecture, each of the OEMs or independently run LTAs compile an OEM specific TVL from the tracking request that they receive, and share their TVLs with other peer LTAs so that an all-inclusive TVL can be compiled, covering all target vehicles in an area.

LTA 1066 may then disseminate the updated TVL, as shown by message 1076, to a V2X endpoint. In particular, each LTA disseminates the completed, all-inclusive TVL to its vehicles. The LTA 1066 can ask a distribution center to disseminate the TVL, potentially along with the CRL and CTL, or it can do so directly by itself.

Existing mechanisms include both push and pull mechanisms for any V2X endpoint to download the CRL, and hence similar approaches may be taken with the TVL. In other cases, the TVL can be distributed via peer to peer messaging, between vehicles, similar to the certificate authority certificates that the "P2P Cert distribution protocols" use.

The obtaining or downloading of the TVL at the endpoint vehicle can be done from a central DC in the embodiment of FIG. 9 or from an OEM DC or directly from the LTA in other cases. This may be done periodically or on demand.

The V2X endpoint may then collect information to determine whether it has sighted the target vehicle. If the target vehicle is sighted, the V2X endpoint may send a TVSR 1078 to the vehicle OEM domain. For example, when a vehicle or RSU operates in a V2X communication mode, and has a non-empty TVL, the V2X endpoint may check the certificate of each received V2X safety message against the TVL and/or engage a camera or other relevant sensor to look for a match in the vehicle characteristics listed in the TVL. A match may be obtained using either the V2V safety message and/or camera or sensor imaging or both, as it is possible to associate a given received V2X message with certain neighboring vehicles detected via sensors.

For example, in one embodiment, the TVSR can have the following entries for each sighting: an identifier of a target vehicle such as the V2X certificate for temporary pseudonym certificates; a license/number plate, for example determined using automatic license/number plate recognition; and/or position information. Optionally the TVSR may also include one or more of the V2X messages received from the target vehicle; images and/or video relating to the target vehicle that may include one or more vehicle characteristics such as the license plate, color, make and model; among other information. The images may be captured, for example, utilizing a camera or other sensor on the V2X endpoint.

The V2X vehicle identifier may be optional if the target vehicle is not sending V2X messages and was only detected by the camera or other sensors. In this case, some of the information described above may be omitted.

The V2X endpoint can send the TVSR with one or more entries to an OEM LTA in the embodiment of FIG. 10.

The vehicle OEM domain may then aggregate sightings received at that domain and send a sighting report 1080 back to the LEMF vehicle node 1014. In particular, the LTA may wait to receive TVSRs from several V2X endpoints before compiling a local TVSR.

In the embodiment of FIG. 10, the local LTA may have received the tracking request or only received TVLs from other LTAs. Regardless, the LTA sends the aggregated sightings report based on data received from V2X endpoints that provided a TVSR to that domain in a given time period.

If a shared LTA exists, then that shared LTA can build the aggregated sightings report based on information received from one or more V2X endpoints. That is for each local or OEM-run LTA, each such LTA can send the aggregated sighting report 1080 back to the LEMF.

The LEMF, once it receives report 1080, may take due action given the information for one or more sighted suspect vehicles.

For the embodiments of FIGS. 9 and 10, the TVL may be limited to a geographical zone. The geographical size of the geographical zone may be larger in certain areas than others. For example, the geographical zone may be larger where the V2X service related data connection coverage is known to be sparse due to a lack of base stations, lack of roadside units, among other factors. In other cases, the geographical zone may be smaller where data coverage is known to be less sparse or more proliferate.

Further, in some cases, management of vehicles is possible. Generally, a vehicle entry on the TVL will have an expiration date/time to ensure the TVL remains relevant. Further, messaging between the vehicle LEMF node and the LTA(s) may allow for a cancellation message to remove a vehicle from the TVL.

In a distributed solution, a first LTA may receive the cancellation message and delete the vehicle from the TVL. The propagation of the TVL to other LTAs without such vehicle listing could indicate that the vehicle should be deleted from the TVLs of those other LTAs.

The LTA, LEMF, Admin Functions, DC, TLM, CPOC, linkage agents, V2X endpoints, ITS stations and network elements described above may be any computing device or network node. Such computing device or network node may include any type of electronic device, including but not limited to, mobile devices such as smartphones or cellular telephones. Examples can further include fixed or mobile user equipment, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, engine control units (ECUs), among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 11:
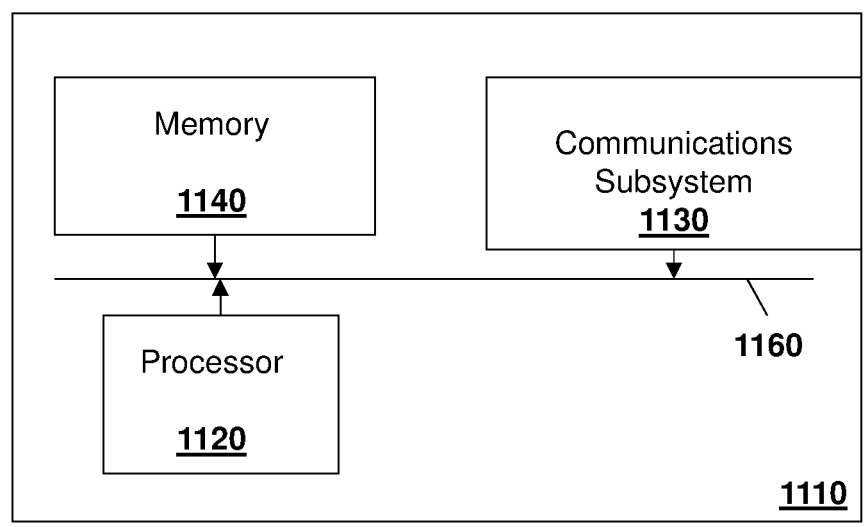
FIG. 11 is a block diagram of a simplified computing device capable of being used with the embodiments of the present disclosure.

One simplified diagram of a computing device is shown with regard to FIG. 11. The computing device of FIG. 11 could be any mobile device, portable device, network node, ITS station, server, or other node as described above.

In FIG. 11, device 1110 includes a processor 1120 and a communications subsystem 1130, where the processor 1120 and communications subsystem 1130 cooperate to perform the methods of the embodiments described above. Communications subsystem 1120 may, in some embodiments, comprise multiple subsystems, for example for different radio technologies.

Processor 1120 is configured to execute programmable logic, which may be stored, along with data, on device 1110, and shown in the example of FIG. 11 as memory 1140. Memory 1140 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 1140, device 1110 may access data or programmable logic from an external storage medium, for example through communications subsystem 1130.

Communications subsystem 1130 allows device 1110 to communicate with other devices or network elements and may vary based on the type of communication being performed. Further, communications subsystem 1130 may comprise a plurality of communications technologies, including any wired or wireless communications technology.

Communications between the various elements of device 1110 may be through an internal bus 1160 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a network element within a Vehicle to Everything (V2X) Communications Domain, the method comprising:
    receiving a tracking request at the network element from a law enforcement monitoring facility for a target vehicle, the tracking request including identifying information for the target vehicle;
    creating a target vehicle list based on the tracking request;
    distributing the target vehicle list to at least one V2X endpoint, wherein the distributing is limited to a geographic region, and wherein the at least one V2X endpoint comprises exclusively authorized vehicles and roadside units within the geographic region;
    receiving at least one sighting report from the at least one V2X endpoint; and
    forwarding the at least one sighting report to a second network element, the forwarding comprising periodically aggregating a plurality of sighting reports.

2. The method of claim 1, wherein the creating the target vehicle list comprises updating an existing target vehicle list with the information from the tracking request.

3. The method of claim 1, wherein the creating the tracked vehicle list comprises:
    forwarding the information to one or more of a Linkage Authority, Registration Authority or Pseudonym Certificate Authority;
    receiving information for the target vehicle; and
    building or appending the target vehicle list with the received information for the target vehicle.

4. The method of claim 1, wherein the sighting report includes one or more of: vehicle identification; vehicle location; license plate information for the target vehicle; images of the target vehicle; make of the target vehicle; model of the target vehicle; color of the target vehicle; V2X messages from the target vehicle; or sensor readings for the target vehicle.

5. The method of claim 1, wherein the method further comprises sharing target vehicle list entries with other tracking network elements within the V2X communications domain.

6. The method of claim 1, wherein the second network element is a law enforcement monitoring facility.

7. The method of claim 1, wherein the target vehicle list is encrypted, and wherein the authorized vehicles or roadside units have decryption keys.

8. A network element within a Vehicle to Everything (V2X) Communications Domain, the network element comprising:
a processor; and
a communications subsystem,
wherein the network element is configured to:
receive a tracking request at the network element from a law enforcement monitoring facility for a target vehicle, the tracking request including identifying information for the target vehicle;
create a target vehicle list based on the tracking request;
distribute the target vehicle list to at least one V2X endpoint, wherein the distributing is limited to a geographic region, and wherein the at least one V2X endpoint comprises exclusively authorized vehicles and roadside units within the geographic region;
receive at least one sighting report from the at least one V2X endpoint; and
forward the at least one sighting report to a second network element, the forwarding comprising periodically aggregating a plurality of sighting reports.

9. The network element of claim 8, wherein the creating the target vehicle list comprises updating an existing target vehicle list with the information from the tracking request.

10. The network element of claim 8, wherein the network element is configured to create the tracked vehicle list by:
forwarding the information to one or more of a Linkage Authority, Registration Authority or Pseudonym Certificate Authority;
receiving information for the target vehicle; and
building or appending the target vehicle list with the received information for the target vehicle.

11. The network element of claim 8, wherein the sighting report includes one or more of: vehicle identification; vehicle location; license plate information for the target vehicle; images of the target vehicle; make of the target vehicle; model of the target vehicle; color of the target vehicle; V2X messages from the target vehicle; or sensor readings for the target vehicle.

12. The network element of claim 8, wherein the network element is further configured to share target vehicle list entries with other tracking network elements within the V2X communications domain.

13. The network element of claim 8, wherein the second network element is a law enforcement monitoring facility.

14. The network element of claim 8, wherein the target vehicle list is encrypted, and wherein the authorized vehicles or roadside units have decryption keys.

15. A non-transitory computer readable medium for storing instruction code, which, when executed by a processor of a network element within a Vehicle to Everything (V2X) Communications Domain cause the network element to:
receive a tracking request at the network element from a law enforcement monitoring facility for a target vehicle, the tracking request including identifying information for the target vehicle;
create a target vehicle list based on the tracking request;
distribute the target vehicle list to at least one V2X endpoint, wherein the distributing is limited to a geographic region, and wherein the at least one V2X endpoint comprises exclusively authorized vehicles and roadside units within the geographic region;
receive at least one sighting report from the at least one V2X endpoint; and
forward the at least one sighting report to a second network element, the forwarding comprising periodically aggregating a plurality of sighting reports.

* * * * *